United States Patent
Kimball

(10) Patent No.: US 8,029,199 B1
(45) Date of Patent: Oct. 4, 2011

(54) CAMERA LENS HOLDER

(75) Inventor: Riley Kimball, Queen Creek, AZ (US)

(73) Assignee: Press Three Photography, Inc., Queen Creek, AZ (US)

( * ) Notice: Subject to any disclaimer, the term of this patent is extended or adjusted under 35 U.S.C. 154(b) by 0 days.

(21) Appl. No.: 12/728,952

(22) Filed: Mar. 22, 2010

(51) Int. Cl.
*G03B 17/56* (2006.01)

(52) U.S. Cl. ..................................... 396/529

(58) Field of Classification Search .............. 359/811, 359/815, 817, 827, 828; 396/71, 73, 529, 396/544
See application file for complete search history.

(56) References Cited

U.S. PATENT DOCUMENTS

| | | | |
|---|---|---|---|
| 3,828,991 A | 8/1974 | Moore | |
| 4,120,434 A | 10/1978 | Hewes | |
| 4,177,894 A | 12/1979 | Petersen | |
| 4,241,459 A | 12/1980 | Quayle | |
| 4,310,092 A | 1/1982 | Muller | |
| 4,330,073 A | 5/1982 | Clark | |
| 4,704,001 A | 11/1987 | Parandes | |
| 4,893,143 A * | 1/1990 | Sheng-Huei | 396/530 |
| 5,373,980 A | 12/1994 | Rowell et al. | |
| 5,862,428 A * | 1/1999 | An | 396/544 |
| 6,256,791 B1 | 7/2001 | Callahan | |
| 6,529,372 B1 | 3/2003 | Ng et al. | |
| 7,194,200 B1 * | 3/2007 | Behlow | 396/5 |
| 7,495,849 B2 * | 2/2009 | Heuser et al. | 359/819 |
| 2006/0283737 A1 | 12/2006 | Hassett | |
| 2008/0013194 A1 | 1/2008 | Dowell | |

FOREIGN PATENT DOCUMENTS

JP 2001-083598 3/2001

* cited by examiner

*Primary Examiner* — W. B. Perkey
(74) *Attorney, Agent, or Firm* — Swanson & Bratschun, L.L.C.

(57) ABSTRACT

A camera lens holder configured to hold a camera lens when the lens is not attached to a camera body. The camera lens holder includes a back plate and an adapter plate associated with the back plate. The back plate and adapter plate may be movably connected with a hinge. The lens holder also includes a lens mount configured to engage with a camera lens associated with the adapter plate. The camera lens holder may include a lens release mechanism to selectively prohibit or allow the removal of a camera lens which has been engaged with the lens mount. Also disclosed is a lens holding system and a method of holding a spare camera lens.

16 Claims, 7 Drawing Sheets

CAMERA LENS HOLDER

TECHNICAL FIELD

The embodiments disclosed herein are directed toward a camera lens holder and more particularly toward an apparatus, system and method for holding one or more camera lenses when the lenses are not attached to a camera.

BACKGROUND

A professional or advanced amateur photographer will typically own and use several camera lenses for each camera body he or she uses. The various camera lenses may have different focal lengths, selected focal ratios or other differing optical characteristics. One of the photographer's various lenses may then be selectively attached to a camera body and used to compose and take a desired film or digital photograph.

Each camera lens will have a lens mount including tabs or other structures that have been machined or formed into the necessary shape or structure to mate with a specific camera body type. The corresponding camera body will have an appropriately machined mounting socket or receptacle configured to receive the camera lens. Typically, the camera lens mounting structure and the corresponding structure associated with the camera body will allow a lens to be quickly inserted into the camera mount and locked into place with a short twist of the lens with respect to the camera body. The camera body or lens will generally include a locking mechanism that engages automatically when the lens is twisted into place, preventing the lens from disengaging accidentally. Thus, when it is desired to remove the lens from the camera body, a button, lever or other release mechanism is activated, allowing the lens to be rotated in the reverse direction and quickly disengaged from the camera body. Camera lens mounting systems as described above are commonly known as camera lens "bayonets" on the lens side and "bayonet mounts" on the camera side.

Only one lens may be attached to the camera body at a given time. Many photographers, including but not limited to wedding photographers, sports photographers, nature photographers, advanced amateur photographers and others will desire to carry multiple lenses with them and quickly but safely interchange lenses as needed to achieve specific photographic goals. Lenses not attached to the camera body are often carried in the padded compartments of a photographer's bag or in special pockets associated with a photographer's vest.

It may be noted that the rear optical elements of a camera lens are relatively protected from dust when the camera lens is attached to a camera body. These rear optical elements, along with the front optical elements, are exposed however if the camera lens is removed from the camera body. Accordingly, a photographer will usually cover the front and rear portions of a camera lens with specially fitted lens caps when a camera lens is removed from the camera body and placed into a vest or bag.

In view of the foregoing, it is readily apparent that some time and effort is necessary for a photographer to safely exchange one camera lens for another in the field. Initially, the first camera lens must be removed from the camera body. Then a dust cap must be found in the photographer's bag and attached to the front and rear surfaces of the first camera lens. Attaching a dust cap is a relatively simple operation; however cap attachment does generally require that the photographer use both hands. Once the dust cap(s) are attached the photographer may secure the first lens in a padded compartment of his photographer's bag. The photographer may then select a replacement lens from his or her bag or vest and remove the dust cap(s) from the second lens. This is also typically a two-handed operation. Once the dust cap(s) have been removed, the photographer may attach the second lens to the camera body.

Although each of the steps associated with exchanging a camera lens stored in a conventional photographer's bag or vest is relatively simple, the process does take two hands and some time and care is necessary to avoid damage to the rear optical surfaces of the respective lenses. It is common for photographers of fast-paced subjects such as wildlife, sports action or weddings to either miss desired photographic opportunities or use a less than ideal lens because of the time and effort necessary to quickly exchange camera lenses.

The embodiments disclosed herein are directed towards overcoming one or more of the problems discussed above.

SUMMARY OF THE EMBODIMENTS

One embodiment is a camera lens holder configured to safely and conveniently hold a camera lens when the lens is not attached to a camera body. The camera lens holder includes a back plate and an adapter plate associated with the back plate. The lens holder also includes a lens mount configured to engage with a camera lens associated with the adapter plate. The camera lens holder may include a lens release mechanism to selectively prohibit or allow the removal of a camera lens which has been engaged with the lens mount.

In certain embodiments the camera lens holder may include a hinge between the back plate and the adapter plate such that the adapter plate may be rotated or articulated around an axis defined by the hinge. Thus, the adapter plate may be placed into more than one orientation with respect to the back plate. In hinged embodiments, a hinge lock may be included which selectively prohibits or allows articulation of the adapter plate around the axis of rotation, providing for the orientation between the adapter plate and back plate to be locked.

The lens release mechanism may include apparatus which prohibits the removal of a camera lens engaged with the lens mount when the adapter plate is placed at a selected orientation. Accordingly, the release mechanism may allow the removal of the camera lens when the adapter plate is placed at a different orientation. Thus, the lens release mechanism may be operationally "locked out" or enabled when the adapter plate is placed in one or more selected orientations.

For example, in one specific embodiment, the lens release mechanism is configured such that the mechanism may be operated and a lens removed from the mount only if the adapter plate is placed into an orientation where the angular separation between the back plate and the adapter plate is about 180°, with the hinge defining the vertex of the angle. In addition, the lens release mechanism may be locked out at all other available angular orientations between the adapter plate and the back plate.

An alternative embodiment is a camera lens holder system including a belt or other garment such as a photographer's vest or a bag plus one or more camera lens holders as described above attached to the belt, garment, bag or vest. In this embodiment the back plate of the camera lens holder will include supplemental attachment structures such as one or more clips, sockets, snap fittings, hook and loop fasteners, buckles or other apparatus adapted to attach the camera lens holder to the belt, garment, vest or bag.

An alternative embodiment is a method of holding a camera lens. The method includes providing a camera lens holder as described above and placing the adapter plate of an empty holder into a first orientation with respect to the back plate. In the first orientation a camera lens may be engaged with the camera lens mount of the holder. Subsequently, the adapter plate may be moved to a second orientation with respect to the back plate. In the second orientation the lens release mechanism may be locked out so that the camera lens cannot be accidently disengaged from the holder. Later, the photographer may move the adapter plate to the first orientation, where the release mechanism is not locked out, and remove the camera lens from engagement with the lens mount. If the camera lens holder is provided with a release mechanism and hinge lock as described above, or alternative apparatus having similar functionality, it is convenient and safe to engage or disengage a lens from the holder using only one hand.

DETAILED DESCRIPTION

Figure 1:
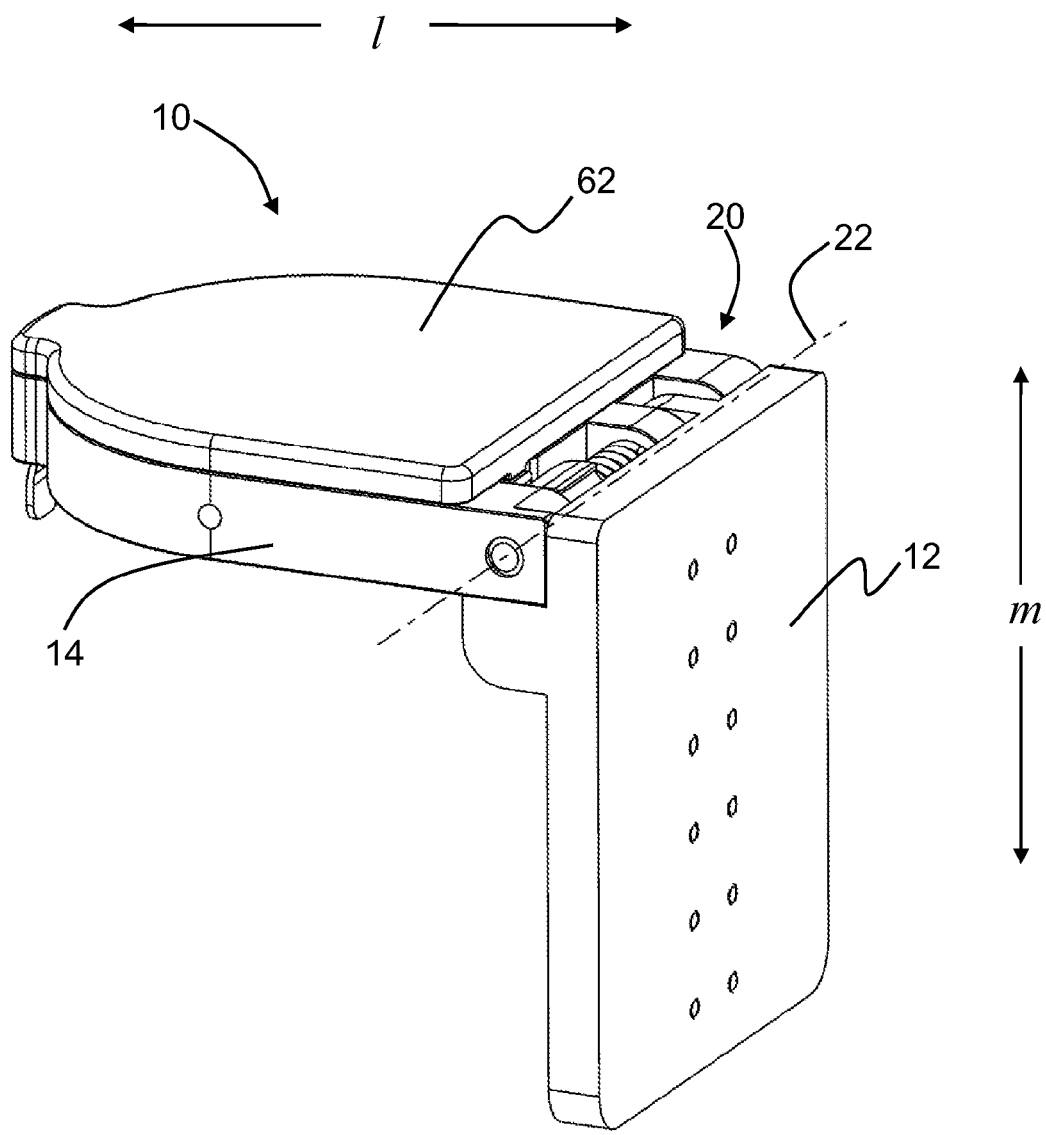
FIG. 1 is a perspective view of a camera lens holder placed into a 90° orientation.

One embodiment is a camera lens holder 10 including a back plate 12 and an adapter plate 14 operatively associated with the back plate. As shown in FIG. 1, the back plate 12 and adapter plate 14 may both be substantially plate-like or planar objects. It is important to note however, that the scope of the present disclosure is not limited to embodiments where the back plate and adapter plate are planar. These structures can be of any shape provided the back plate and adapter plate elements function substantially as described herein. In a simplest embodiment, the association of the black plate 12 with the adapter plate 14 can be a static connection such as a welded joint, bolted connection or other non-movable attachment. Alternatively, the association between the back plate 12 and adapter plate 14 may provide for specific movement between these elements as described in detail below. Generally, the back plate 12 provides an attachment point for a photographer's belt of other garment and the adapter plate 14 provides an attachment point for a lens. The back plate 12 may include one or more supplemental attachment structures such as clips, sockets, snap fittings, hook and loop fasteners, buckles or other apparatus adapted to attach the camera lens holder 10 to a belt, garment, vest bag or other structure.

Figure 2A:
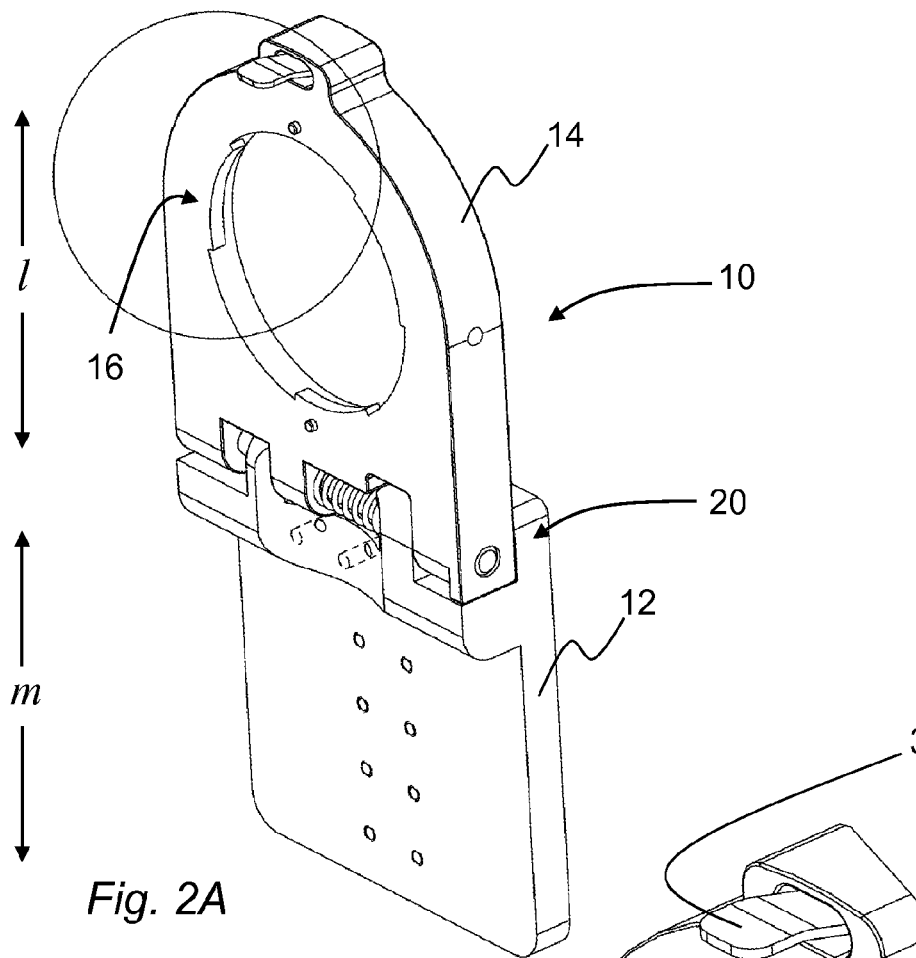
FIG. 2A is a perspective view of the camera lens holder of FIG. 1 placed into a 180° orientation.
Figure 2B:
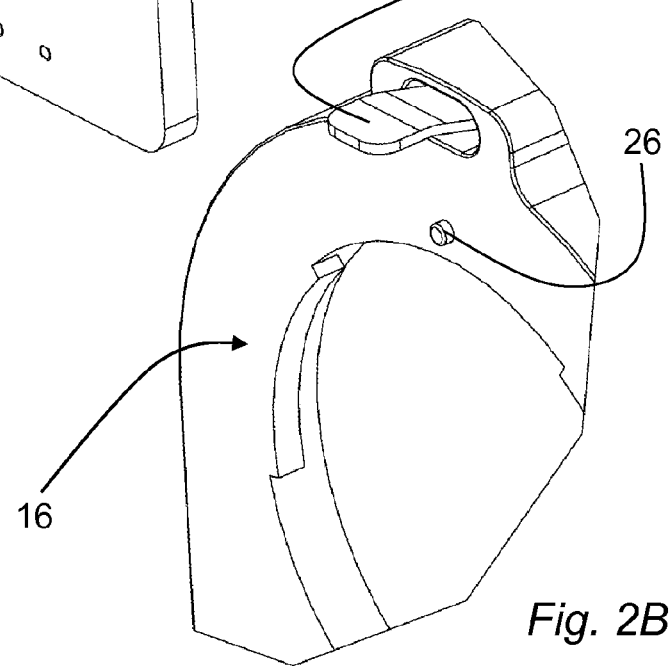
FIG. 2B is an enlarged view of the circled portion of FIG. 2A showing detail of a lens mount.
Figure 3:
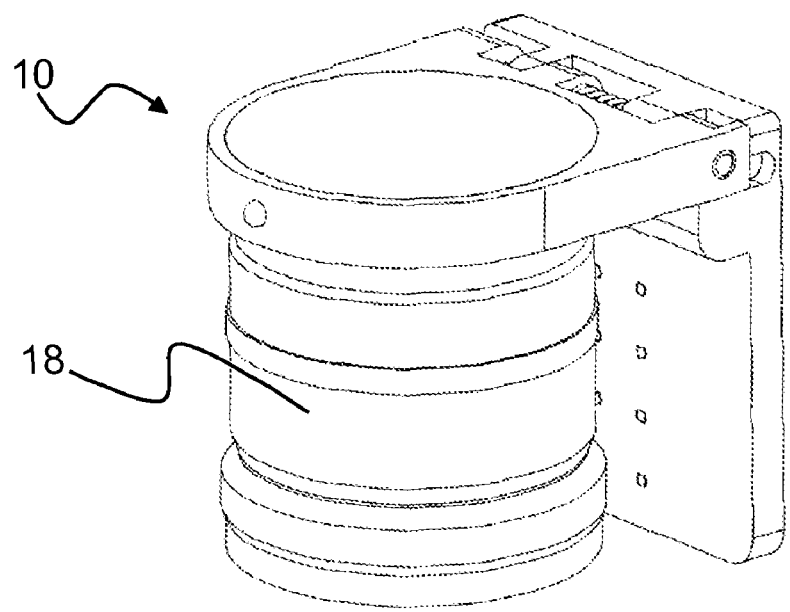
FIG. 3 is a perspective view of a camera lens holder with a camera lens engaged in the lens mount.

The camera lens holder 10 will also include a lens mount 16 operatively associated with the adapter plate 12. As is best seen in FIG. 2(a) and the enlarged view of FIG. 2(b) showing the circled portion of FIG. 2(a), the lens mount 16 will be structurally similar to a camera lens mounting structure or bayonet which may be found on the body of a camera that accepts interchangeable lenses. Thus, the lens mount 16 will include tabs, a bayonet mount, or other structures as are required to receive and support a camera lens in substantially the same fashion as that camera lens would be attached to a camera body. It may be noted that various camera and lens manufactures have proprietary or substantially exclusive styles of mounts associated with their respective brands of camera lenses and camera bodies. The lens mount 16 may be implemented with attachment structures that correspond to the attachment structures utilized by any selected camera lens or camera body manufacturer. FIGS. 1 and 2 show an embodiment of the camera lens holder 10 without an attached camera lens. FIG. 3 illustrates a camera lens holder 10 of with a representative camera lens 18 received in the lens mount 16.

The camera lens holder 10 may include a hinge 20 providing a hinged connection between the back plate 12 and adapter plate 14. The hinge 20 provides and defines an axis of rotation 22 between the back plate 12 and adapter plate 14 thereby providing for the placement of the adapter plate into more than one orientation with respect to the back plate 12. For example, FIG. 1 illustrates a configuration where the length l of the adapter plate 14 is substantially perpendicular to, or at an angle of about 90° to, the length m of the back plate 12. Alternatively, as shown in FIG. 2 the hinge 20 provides for the articulation of the adapter plate 14 around the axis of rotation 22 such that the length l of the adapter plate 14 is substantially parallel to the length m of the back plate 12. In the orientation illustrated in FIG. 2, the length l and the length m generally define an angle of about 180° with the axis of rotation being the vertex of the angle. The scope of the present disclosure is not limited to any particular orientation between the back plate 12 and adapter plate 14.

The camera lens holder 10 may further include a lens release mechanism 24 which serves to selectively prohibit or allow the removal of a camera lens 18 placed into the lens mount 16. Accordingly, the lens release mechanism 24 serves a purpose similar to the lens lock customarily associated with a camera body. Typically, a camera lens may be attached to a camera body by inserting the rear portion of the camera lens into an appropriately configured mount on the camera body. The lens may then be twisted or rotated a small amount, at which time a lens locking pin or other mechanism associated with the camera body or lens engages to prevent the reverse rotation necessary to remove the camera lens. Reverse rotation and lens removal may be allowed when the lock is disengaged by depressing a button or lever on the camera body. The lens release mechanism 24 disclosed herein performs a similar function.

Figure 4:
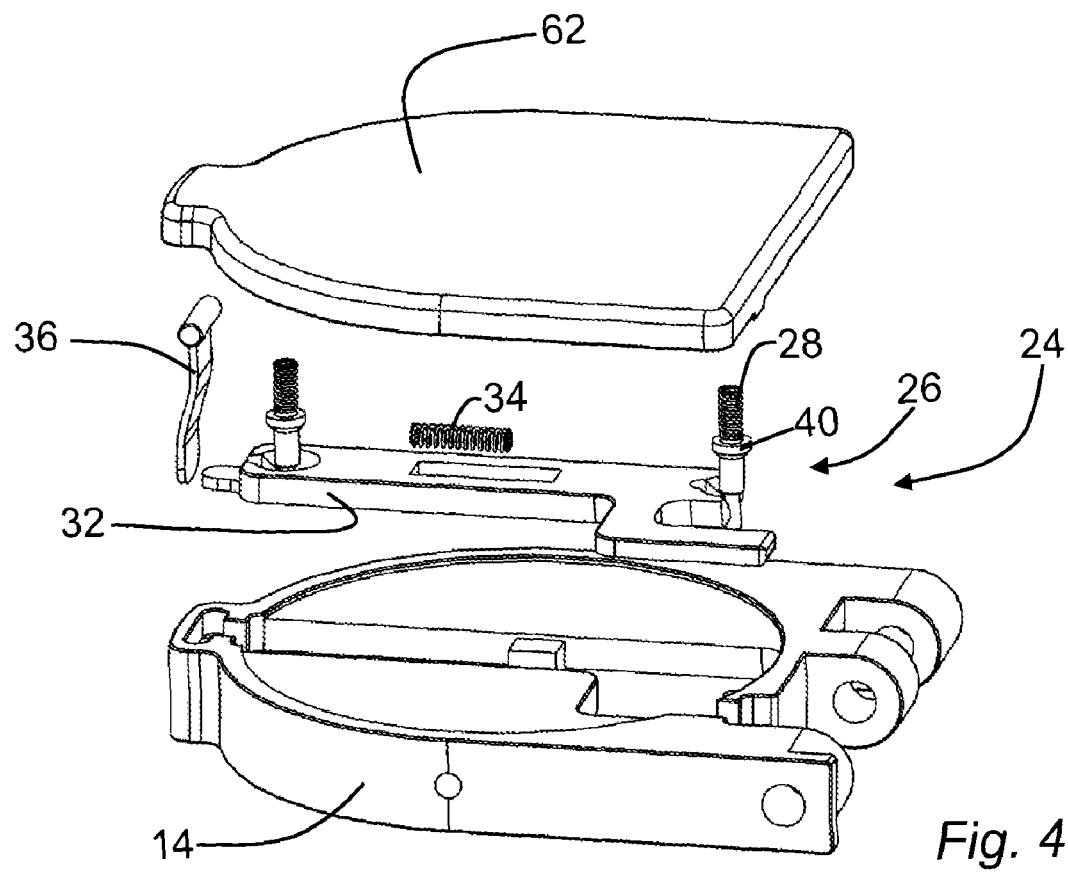
FIG. 4 is an exploded perspective view of an adapter plate.
Figure 5A:
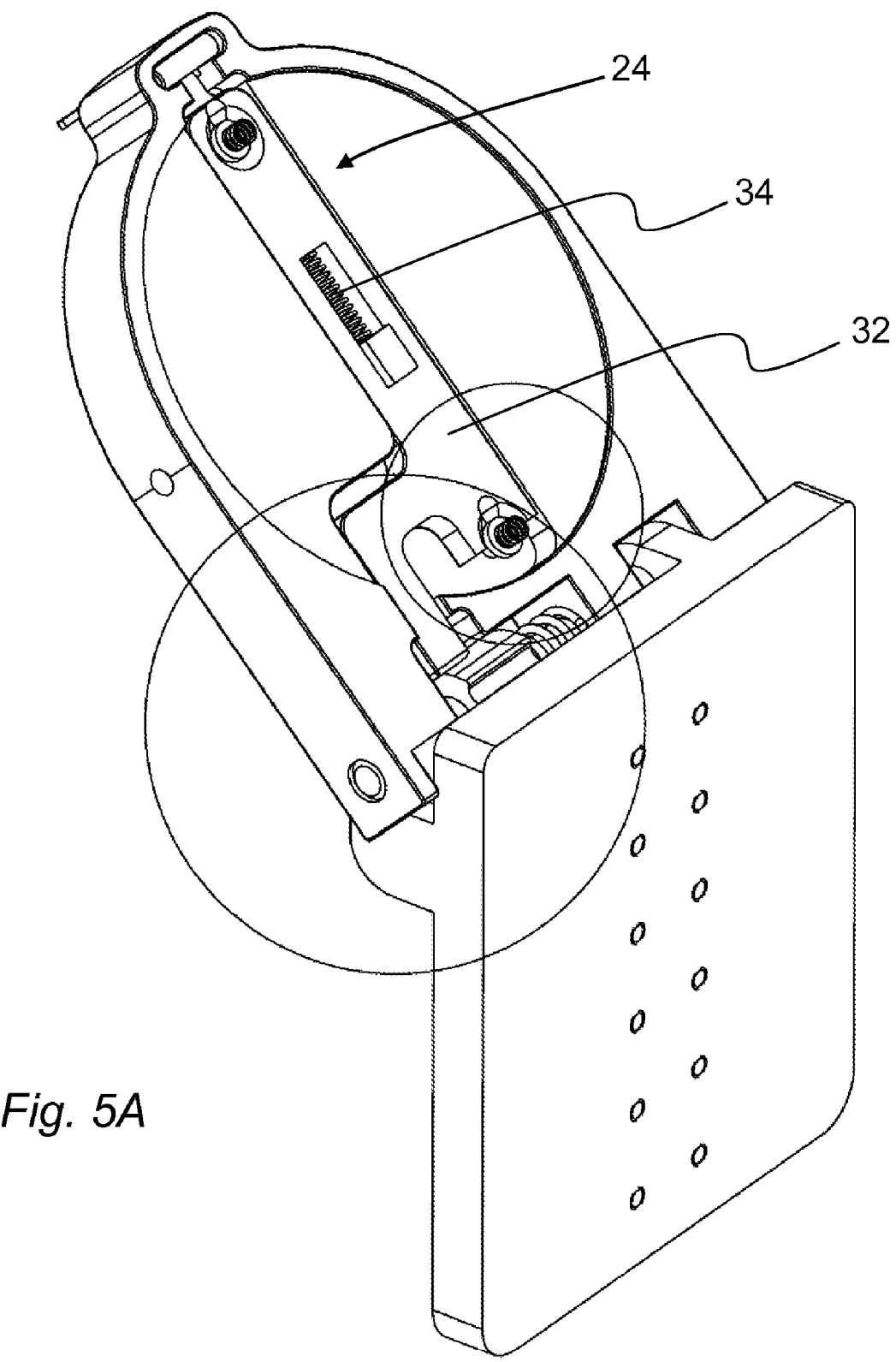
FIG. 5A is a perspective view of the camera lens holder of FIG. 1 with the top plate removed, and where the angular orientation between the adapter plate and back plate is at an intermediate angle and the hinge lock is disengaged.
Figure 5B:
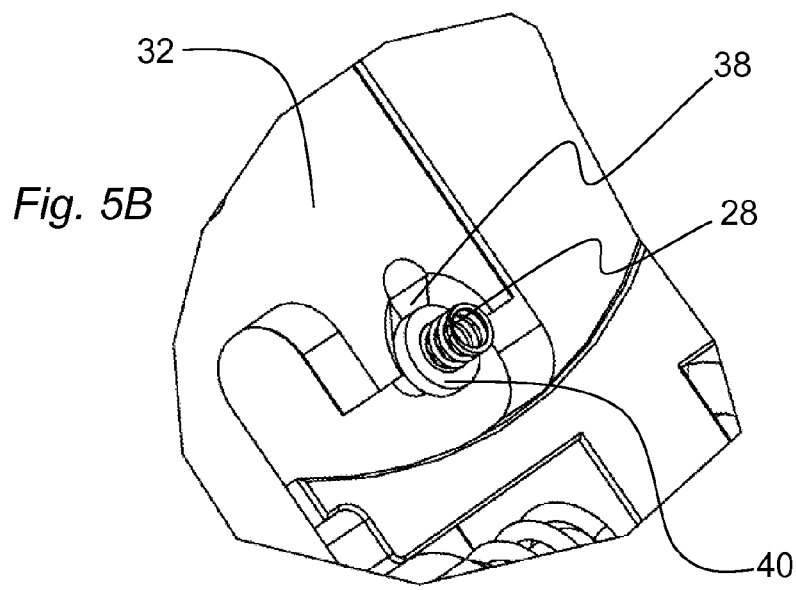
FIG. 5B is an enlarged view of the structure shown on FIG. 5A within the smaller circled region.

In particular, as shown in FIGS. 4 and 5 (a-c), a representative lens release mechanism 24 may include one or more locking pins 26 associated with the adapter plate 14 and lens mount 16 (not shown on FIG. 5 or 6). The locking pin(s) 26 are positioned to engage with corresponding sockets included on the mounting surface of a typical camera lens. As also shown on FIGS. 4, 5(a) and in particular on the enlarged view of FIG. 5(b) showing the smaller circled portion of FIG. 5(a) locking pin(s) 26 may be associated with a pin bias spring 28 which serves to bias any locking pin 26 toward and into the corresponding socket on a camera lens. Thus, as a camera lens is attached to the adapter plate 14, the lens will typically be fitted into a socket defined by the lens mount 16, and rotated slightly until one or more locking pins 26 engage with a corresponding receptacle on the camera lens, through the action of a pin bias spring 28.

Upon the engagement of locking pin(s) 26 with a camera lens, the lens cannot accidentally rotate in the reverse direction as is required to remove the lens from the lens mount 16. Accordingly, the lens release mechanism 24 must also include apparatus for the selective disengagement of the lens. The representative release mechanism as shown on FIGS. 4 and 5(a-c) includes a release slide 32, release slide return spring 34 and lever 36. It may be noted from the enlarged view of FIG. 5(b) that the release slide 32 includes ramped surfaces 38 configured to engage the shoulder 40 of a locking pin 26 if the release slide is moved toward the hinge 20. Thus, operation of the lever 36 toward the hinge will cause the release slide 34 to move, lifting and disengaging one or more locking pins 26 from engagement with a camera lens. The slide return spring 34 may be provided to bias the release slide away from the hinge 20, thus assuring that the lens locking mechanism 24 remains engaged with a camera lens until the release mechanism 30 is purposefully articulated.

It should be noted that the lens release mechanism 24 and the specific structures illustrated in FIGS. 5-6 are non-exclusive representative example of appropriate mechanisms for securing a camera lens to the lens holder 10 and releasing a camera lens from the holder. The scope of the present disclosure includes other locking and release mechanisms or devices which serve the purpose of locking or releasing a camera lens attached to the lens mount 16 of the adapter plate 14.

As described in detail immediately above, the lens release mechanism 24 may be articulated to release a camera lens from engagement with the lens mount 16 of the adapter plate 14. It may be desirable in some embodiments however, to provide the lens release mechanism 24 with additional apparatus which functions to enhance the security of the camera lens holder 10 and facilitates the convenient and safe one-handed use of the camera lens holder 10.

In particular, selected embodiments of the camera lens holder 10 may be configured such that the lens release mechanism 24 will prohibit the removal of a camera lens placed in the lens mount 16 if or when the adapter plate is positioned at one or more specific orientations with respect to the back plate 12. In addition, the lens release mechanism 24 may further be configured to allow the removal of a camera lens when the adapter plate 14 is placed at selected alternative orientations with respect to the back plate 12.

For example, the orientation where articulation of the lens release mechanism 24 is prohibited may be, but is not limited to, the 90° angle orientation of FIG. 1. On the contrary, the lens locking mechanism 24 may be configured to allow operation of the release slide 32 or otherwise allow removal of a camera lens when the adapter plate 14 is at a second orientation for example, the parallel/180° orientation of FIG. 2. It is important to note that removal of a camera lens may be allowed or prohibited over a specific range of orientations as well. For example, as described in detail below, lens removal could be allowed at the substantially 180° orientation of FIG. 2 and prohibited at all other possible angular orientations.

Figure 5C:
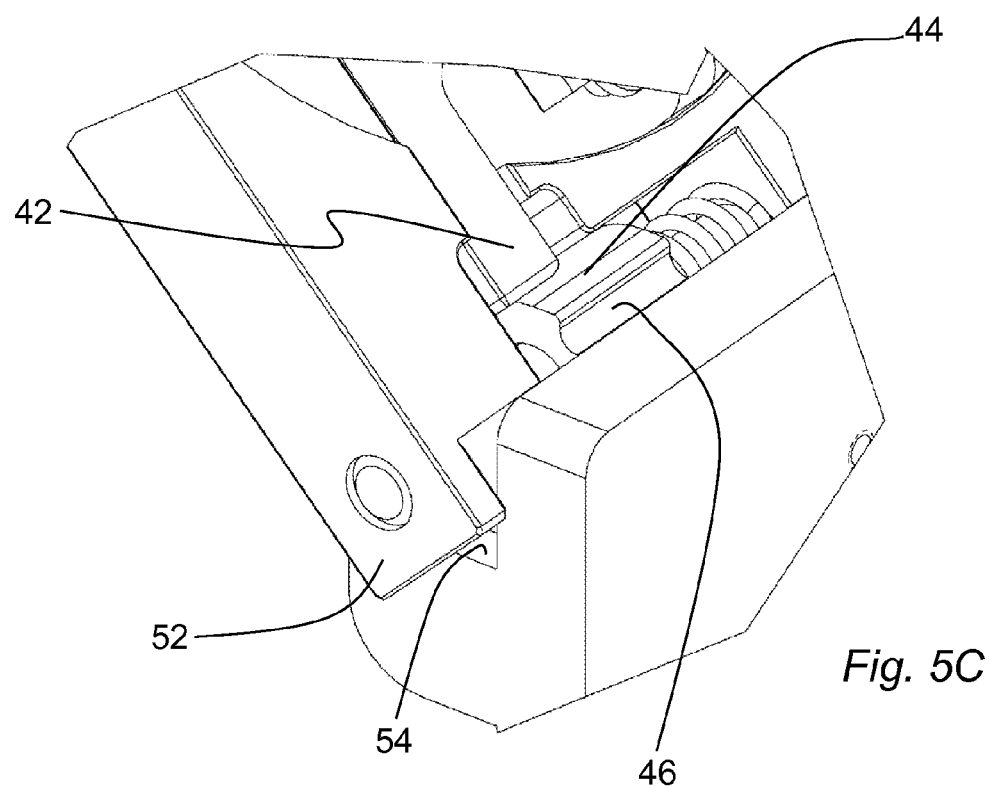
FIG. 5C is an enlarged view of the structure shown on FIG. 5A within the larger circled region.

The inclusion of a lens release mechanism 24 which may only be operated at selected orientations between the adapter plate 14 and back plate 12 provides an additional level of lens holder security. In addition, this feature provides enhanced user functionality as described in detail below. One representative example of a lens locking mechanism 24 that may be operated only at specific orientation(s) between the back plate 12 and adapter plate 14 is illustrated in FIG. 5(a) and the enlarged view of FIG. 5(c) showing the larger circled portion of FIG. 5(a). In this embodiment, the release slide 32 may be provided with a lockout tab 42 which, in most orientations abuts a structure such as the surface 44 associated with the back plate 12. Accordingly, in the embodiment illustrated in FIG. 5(c) the release slide 32 cannot move laterally toward the hinge, even if lever 36 is pressed, since the lockout tab 42 abuts the surface 44 of the back plate 12.

On the contrary, if the adapter plate 14 is rotated to the 180°/parallel configuration of FIG. 2 the lockout tab is free to be articulated. One structure for accomplishing this functionality is illustrated in FIG. 5(c), where a channel 46 associated with the back plate 12 is configured to receive the lockout tab 42 and allow lateral movement of the release slide 32 when the adapter plate is placed in the appropriate orientation. Thus, in the embodiment of FIGS. 5(a-c), the release slide 32 may only be operated to release a camera lens when the adapter plate 14 is placed into an approximately parallel relationship with the back plate 12. Articulation of the release slide is prohibited in other angular orientations. It is important to note that the shape and structure of the release slide 32, lockout tab 42, surface 44, channel 46 or analogous structures may be modified as desired to determine which orientations will allow operation of lens release mechanism 24 to remove a lens and which other orientations will prohibit operation of the lens release mechanism 24.

The camera lens holder 10 may be implemented with any type of hinge 20 or no hinge at all. However, certain functional advantages may be realized if the camera lens holder 10 includes a hinge 20 having a hinge lock 48 which selectively prohibits or allows articulation of the adapter plate 14 around the axis of rotation 22. For example, a hinge lock 48 may be engaged to selectively prohibit articulation of the adapter plate 14 around the axis of rotation 22 when the adapter plate 14 is placed into one or more specific orientations with respect to the back plate 12, unless the hinge lock 48 is released. In the representative embodiment of FIGS. 1-7, the hinge lock 48 will engage to selectively prohibit articulation the adapter plate 14 when the adapter plate 14 is placed in an angular orientation of either about 90° or about 180° with respect to the back plate 12.

Figure 6A:
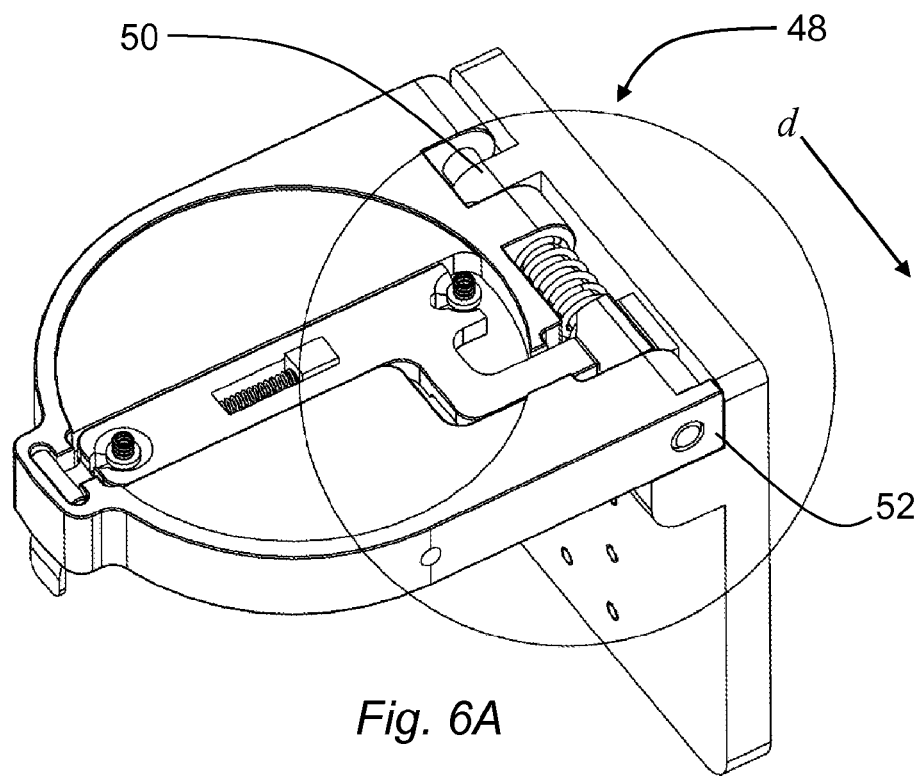
FIG. 6A is a perspective view of the camera lens holder of FIG. 5A with the adapter plate placed into a 90° orientation and with the hinge lock engaged.
Figure 6B:
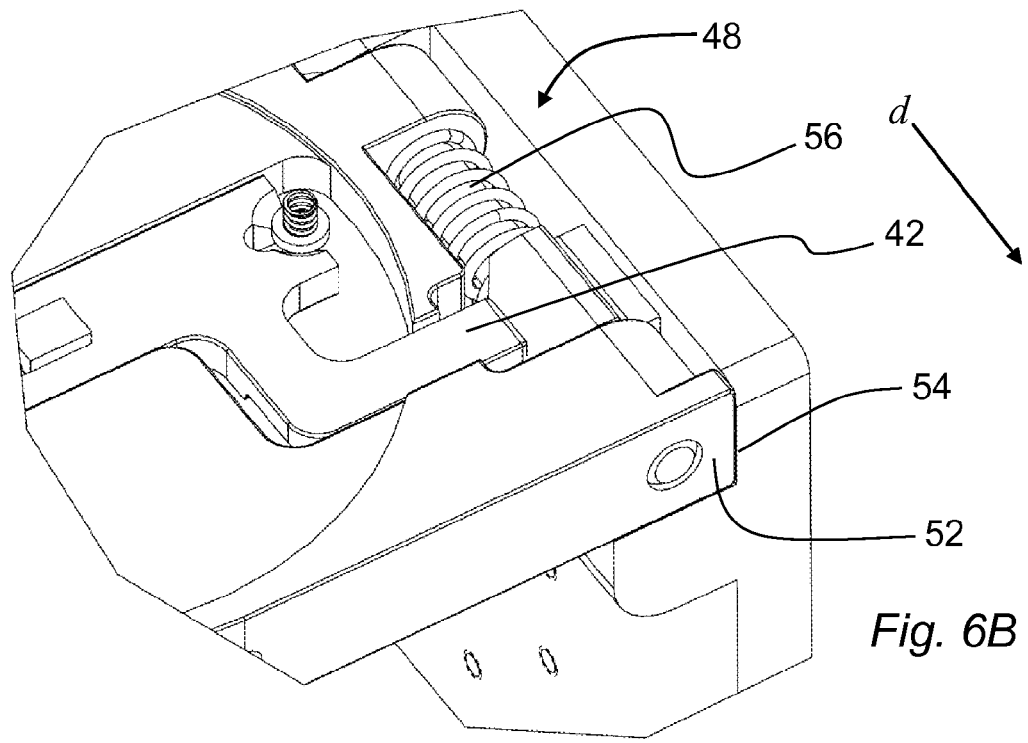
FIG. 6B is an enlarged view of the structure shown within the circled region of FIG. 6A.

One representative example of a hinge lock 48 is shown in FIGS. 6(a) and 6(b). The hinge lock 48 of these figures includes a hinge 20 implemented with an axially movable joint 50. The hinge lock provides for free articulation of the hinge 20 if the adapter plate 14 is moved lengthwise along the hinge axis, in the direction d, as shown on FIG. 6(a), away from the back plate 12. On the contrary, the hinge lock 48 prohibits articulation of the hinge 20 if the adapter plate 14 is moved lengthwise along the hinge axis toward the back plate 14 (opposite the direction d.

As shown in FIG. 5(c), 6(a) and in particular the enlarged view of FIG. 6(b) showing the circled portion of FIG. 6(a), a hinge lock 48 may be implemented with a hinge lock tab 52 associated with the adapter plate 14. The hinge lock tab 52 will provide a positive rotation stop at the 180° or 90° orientation of FIGS. 1 and 2 when engaged with a corner 54 defined by the back plate 12 or an associated structure. As shown in FIGS. 5 and 6, the hinge lock tab 52 may be disengaged from the corner 54 when the adapter plate is slid lengthwise along the hinge axis in the direction d. Thus, the hinge lock 48 provides for selective free rotation between the back plate 12 and adapter plate 14 with positive engagement at certain positions. The axially movable joint 50 may optionally include a biasing spring 56 which serves to bias the adapter plate 14 toward the back plate 12 thus biasing the hinge lock tab 52 into engagement with the corner 54 when the hinge lock 48 becomes engaged.

As is best viewed on FIGS. 1 and 4, the camera lens holder 10 may include a top plate 62 which serves to protect other components from dust, and further serves to shield the rear lens element of a camera lens attached to the camera lens holder 10 from dust or debris. Additional protection of the rear lens element of an attached camera lens may be provided by a sealed connection between the lens mount 16 and the mounting structure of the lens. A sealed connection may be provided with a rubber or felt gasket, an O ring or other sealing structure to assure a somewhat airtight and substantially dust free connection.

The lens locking pin(s) 26 and pin bias springs 28 described in detail above will provide an audible click when a lens is fully engaged with the camera lens holder 10. The camera lens holder 10 may optionally be provided with a sensor associated with the lens locking mechanism 24 which electronically, mechanically or optically senses the locked or unlocked status of the locking mechanism and provides audible or tactile feedback such as a bell or vibration when a lens is engaged or disengaged.

Figure 7A:
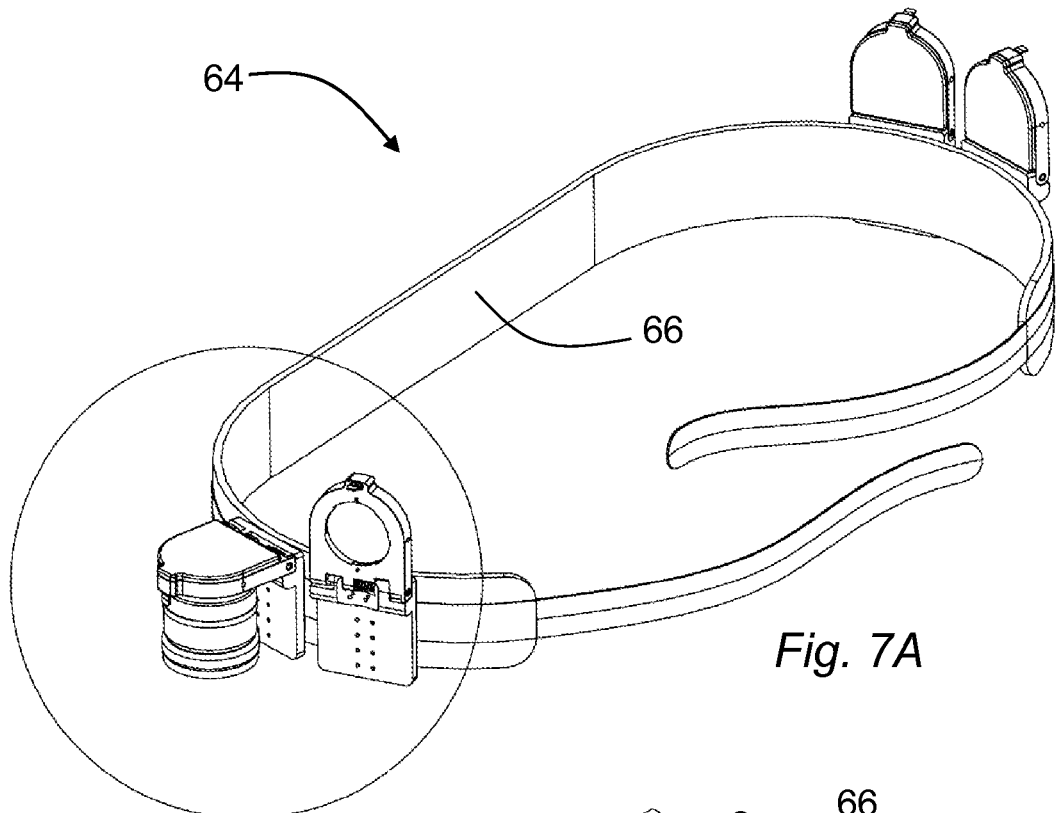
FIG. 7A is a perspective view of a system including a belt and multiple camera lens holders.
Figure 7B:
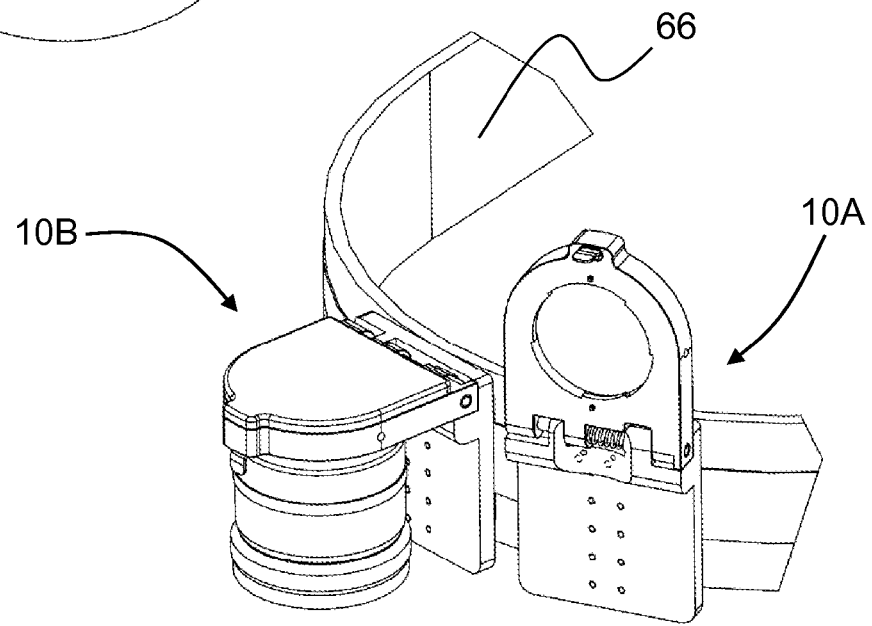
FIG. 7B is an enlarged view of the circled portion of FIG. 7A.

An alternative embodiment includes a camera lens holder system 64 as shown on FIGS. 7(*a*) and 7(*b*). A system 64 may include multiple camera lens holders 10 attached to a garment, vest, belt, strap or other structure, for example, the photographer's belt 66 of FIG. 7(*a*). Any practical number of camera lens holders 10 may be attached to a vest, bag, or belt 66. Thus, if the photographer is using a system 64 as disclosed herein he or she will have the ability to carry multiple lenses for ready interchange at any given time. The various camera lens holders 10 of a system 64 may each have the same type of lens mount 16, configured to hold the lenses of one brand of camera. Alternatively, the lens mounts 16 of holders 10 may be of mixed varieties configured such that the system can hold lenses from various manufacturers.

Another embodiment is a method of holding a camera lens. The method includes selectively attaching or removing a camera lens to a camera lens holder 10 as described herein. Certain features of the camera lens holder 10 facilitate the convenient, safe and one-handed use of a camera lens holder 10. In particular, as described above, the hinge 20 between the back plate 12 and adapter plate 14 of a camera lens holder may include a hinge lock 48 such that the back plate and adapter plate structures can be secured into one or more selected orientations with respect to each other. For example, the hinge lock 48 may provide that the back plate 12 and adapter plate 14 may be secured either at right angles to each other or parallel to each other. Furthermore, as described above, the lens release mechanism 24 may be configured to only allow the removal of a lens at one or more selected orientations. In use, a photographer with a system 64 such as illustrated on FIG. 7 may have at least one open camera lens holder 10A on his or her belt 66, vest or other garment. The open camera lens holder 10A may be placed into the 180°/parallel position of FIG. 2 by the photographer and held in that orientation by a hinge lock 48. When desired, the photographer may remove the camera lens from a camera body, and with one hand place the lens into engagement with the lens mount of holder 10A. The photographer may then rotate the lens until the lens locking mechanism 24 engages with an optional audible click or other feedback. The photographer may then, still using the same hand, operate the hinge lock 48 to move the adapter plate 14 down into the 90°/right angle position of holder 10B (as also shown on FIG. 7). In this orientation, operation of the lens release mechanism 24 may be prohibited, thus safely securing the camera lens from accidental disengagement with the camera lens holder 10B.

Later, the photographer may desire to re-attach the lens in holder 10B to his or her camera. Initially, the lens cannot be removed from the holder 10B because the holder is in the 90°/right angle locked out position. The photographer may however, with one hand, slide the adapter plate of the holder lengthwise along the axis of rotation and away from back plate 20, or otherwise release a hinge lock 48, thereby allowing the adapter plate 14 to be rotated to the 180° position. At this point in time, the lens release mechanism may be operated. For example, the photographer may, with the thumb of the hand which is supporting the lens, depress lever 36 while rotating the lens to remove it from engagement with holder. The photographer may then, with the same hand, install the lens on the camera body.

Thus, the camera lens holder 10 as described above provides for the quick and safe detachment of a lens from a camera body, followed by storage of the lens and retrieval of the same lens or a replacement lens all with one hand. Furthermore, the system 64 and camera lens holder 10 are configured to protect the rear elements of a camera lens from dust without the use of conventional dust caps.

Unless otherwise indicated, all numbers expressing quantities of ingredients, dimensions reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the various embodiments have been particularly shown and described with reference to a number of examples, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

The description of the various embodiments have been presented for purposes of illustration and description, but is not intended to be exhaustive or limiting of the invention to the form disclosed. The scope of the described embodiments is limited only by the scope of the following claims. Many modifications and variations will be apparent to those of ordinary skill in the art. The embodiment described and shown in the figures was chosen and described in order to best explain the principles of all embodiments, the practical application of the embodiments, and to enable others of ordinary skill in the art to understand the various embodiments with various modifications as are suited to the particular use contemplated.

What is claimed is:

1. A camera lens holder comprising:
   a back plate;
   an adapter plate operatively associated with the back plate;
   a hinge between the back plate and the adapter plate, the hinge defining an axis of rotation around which the adapter plate may be articulated, thereby providing for the placement of the adapter plate into more than one orientation with respect to the back plate;
   a hinge lock which selectively prohibits or allows articulation of the adapter plate around the axis of rotation;
   a lens mount operatively associated with the adapter plate; and
   a lens release mechanism to selectively prohibit or allow removal of a camera lens engaged with the lens mount.

2. The camera lens holder of claim 1 wherein the lens release mechanism prohibits the removal of a camera lens engaged with the lens mount when the adapter plate is placed at a first orientation with respect to the back plate and allows the removal of a camera lens engaged with the lens mount when the adapter plate is placed at a second a orientation with respect to the back plate.

3. The camera lens holder of claim 2 wherein the adapter plate may be articulated around the axis of rotation to place the adapter plate in an orientation with respect to the back plate which comprises an angular separation between the back plate and adapter plate ranging from about 90 degrees to about 180 degrees.

4. The camera lens holder of claim 3 wherein the lens release mechanism allows the removal of a camera lens engaged with the lens mount when the adapter plate is placed in an orientation which comprises an angular separation between the back plate and adapter plate of about 180 degrees.

5. The camera lens holder of claim 1 wherein the lens release mechanism comprises a release slide and at least one lens locking pin which may be selectively disengaged from a camera lens engaged with the lens mount by sliding movement of the release slide.

6. The camera lens holder of claim 5 wherein the lens locking mechanism further comprises a lockout tab operatively associated with the release slide which prohibits sliding movement of the release slide when the adapter plate is placed in a selected orientation with respect to the back plate.

7. The camera lens holder of claim 6 wherein sliding movement of the release slide is allowed only when the adapter plate is placed in an orientation which comprises an angular separation between the back plate and adapter plate of about 180 degrees.

8. The camera lens holder of claim 1 wherein the hinge lock engages to prohibit articulation of the adapter plate around the axis of rotation when the adapter plate is placed in an orientation with respect to the back plate which comprises an angular separation between the back plate and adapter plate ranging from about 90 degrees to about 180 degrees.

9. The camera lens holder of claim 8 wherein the hinge lock comprises an axially movable joint associated with the hinge between the adapter plate and the back plate which axially movable joint permits articulation of the adapter plate around the axis of rotation when the adapter plate is moved away from the back plate along the axially moveable joint and prohibits articulation of the adapter plate around the axis of rotation when the adapter plate is moved toward the back plate along the axially moveable joint.

10. The camera lens holder of claim 9 further comprising a bias spring biasing the adapter plate toward from the back plate at the axially moveable joint.

11. A camera lens holder system comprising:
    a belt; and
    one or more camera lens holders attached to the belt, each camera lens holder comprising:
       a back plate;
       an adapter plate operatively associated with the back plate; and
       a lens mount operatively associated with the adapter plate.

12. The camera lens holder system of claim 11 wherein at least one of the camera lens holders further comprises:
    a lens release mechanism that selectively prohibits or allows removal of a camera lens engaged with the lens mount;
    a hinge between the back plate and the adapter plate, the hinge defining an axis of rotation around which the adapter plate may be articulated thereby providing for the placement of the adapter plate in more than one orientation with respect to the back plate.

13. The camera lens holder system of claim 12 wherein at least one of the camera lens holders further comprises a hinge lock which selectively prohibits articulation of the adapter plate around the axis of rotation; and the lens release mechanism prohibits the removal of a camera lens engaged with the lens mount when the adapter plate is placed at a first orientation with respect to the back plate and allows the removal of a camera lens when the adapter plate is placed at a second a orientation with respect to the back plate.

14. A method of holding a camera lens comprising:
    providing a camera lens holder comprising a back plate, an adapter plate moveably associated with the back plat, a lens mount associated with the adapter plate, and a lens release mechanism to selectively prohibit or allow removal of a camera lens engaged with the lens mount, wherein the adapter plate may be placed and locked in more than one orientation with respect to the back plate;
    placing and locking the adapter plate into a selected first orientation with respect to the back plate;
    engaging a camera lens to the lens mount; and
    moving the adapter plate to a second orientation with respect to the back plate.

15. The method of holding a camera lens of claim 14 further comprising:
    moving the adapter plate to the first orientation with respect to the back plate; and
    removing the camera lens from engagement with the lens mount.

16. The method of holding a camera lens of claim 15 wherein the adapter plate is positioned and the camera lens is engaged or removed from the lens mount by a user using one hand.

* * * * *